(12) United States Patent
Vandevelde

(10) Patent No.: US 11,267,078 B2
(45) Date of Patent: Mar. 8, 2022

(54) LASER CUTTING MACHINE FOR THE WORKING OF MATERIAL, PRESENTED IN SHEET AND/OR REEL FORM

(71) Applicant: InterVer Management S.A., Grass (LU)

(72) Inventor: Pierre Vandevelde, Gosselies (BE)

(73) Assignee: INTERVER MANAGEMENT S.A., Grass (LU)

( * ) Notice: Subject to any disclaimer, the term of this patent is extended or adjusted under 35 U.S.C. 154(b) by 189 days.

(21) Appl. No.: 16/313,271

(22) PCT Filed: Jun. 30, 2017

(86) PCT No.: PCT/EP2017/066242
§ 371 (c)(1),
(2) Date: Dec. 26, 2018

(87) PCT Pub. No.: WO2018/002289
PCT Pub. Date: Jan. 4, 2018

(65) Prior Publication Data
US 2019/0143456 A1   May 16, 2019

(30) Foreign Application Priority Data

Jun. 30, 2016   (LU) .......................................... 93 134

(51) Int. Cl.
*B23K 26/38*   (2014.01)
*B23K 26/08*   (2014.01)
(Continued)

(52) U.S. Cl.
CPC ............ *B23K 26/38* (2013.01); *B23K 26/083* (2013.01); *B23K 26/0846* (2013.01);
(Continued)

(58) Field of Classification Search
CPC .............. B23K 26/083; B23K 26/0846; B23K 26/0869; B23K 26/38; B23K 26/02; B23K 26/702
See application file for complete search history.

(56) References Cited

U.S. PATENT DOCUMENTS

| 7,148,446 B2 | 12/2006 | Harnisch et al. | |
| 2003/0234240 A1* | 12/2003 | Yamazaki | B23K 26/702 219/121.62 |

(Continued)

FOREIGN PATENT DOCUMENTS

DE   102014114367 A1   4/2016

OTHER PUBLICATIONS

International Preliminary Report on Patentability for International Application No. PCT/EP2017/066242, International Filing Date Jun. 30, 2017, dated Oct. 18, 2017, 6 pages, includes English Translation.

*Primary Examiner* — Erin E McGrath
(74) *Attorney, Agent, or Firm* — Cantor Colburn LLP

(57) ABSTRACT

A laser cutting machine including an X1 axis provided with clamps which make it possible to firmly grip a material to be cut in sheets or on reels (the blank) enabling the material to be moved from left to right; a Y-axis: perpendicular to the X1 axis, enabling the movement of a laser cutting head; an X2 axis with at least one pair of clamping rollers enabling the material to be moved to the left or to the right; a straightening/de-cambering/levelling system placed beside this X2 axis comprising an optimised number of rollers; a unit incorporating the X2 axis and the straightening system which can be moved upwards or downwards, and a motorized discharge table enabling the cut elements (scrap and good pieces) to be discharged at a precise point, delimiting a picking zone.

5 Claims, 15 Drawing Sheets

(51) Int. Cl.
  *B23K 26/70*   (2014.01)
  *B23K 101/16*   (2006.01)
  *B23K 101/18*   (2006.01)
(52) U.S. Cl.
  CPC ........ *B23K 26/0869* (2013.01); *B23K 26/702* (2015.10); *B23K 2101/16* (2018.08); *B23K 2101/18* (2018.08)

(56) References Cited

U.S. PATENT DOCUMENTS

| | | | |
|---|---|---|---|
| 2004/0108305 A1* | 6/2004 | Harnisch | B21D 28/10 219/121.72 |
| 2008/0210516 A1* | 9/2008 | Blaser | B23K 26/702 198/341.05 |
| 2014/0374393 A1 | 12/2014 | Battheu | |

* cited by examiner

LASER CUTTING MACHINE FOR THE WORKING OF MATERIAL, PRESENTED IN SHEET AND/OR REEL FORM

CROSS REFERENCE TO RELATED APPLICATIONS

This application is a National Stage application of PCT/EP2017/066242, filed Jun. 30, 2017, which claims the benefit of and priority to Luxembourg Patent Application No. 93134, filed Jun. 30, 2016, content of both of which are incorporated by reference in their entirety herein.

TECHNICAL FIELD

The disclosed embodiments concerns a laser cutting machine for the working of material in sheet and reel form.

BACKGROUND

In laser cutting systems, there are overall two machine configurations: laser cutting gantries and laser cutting lines from reels of material.

Describing these two systems in more detail, it is important to establish the terminology.

In these cutting systems, the X and Y axes are generally perpendicular to one another. The use of a laser cutting head involves an additional axis in order to set a constant distance between the output of the laser beam and the surface of the metal sheet (the plane defined by the X and Y axes); this additional axis is generally called Z. In some cases, the additional Z-axis cutting head may have additional axes which we will call Xa and Ya, which are used with a very short travel to carry out very small cuts such as holes, which avoids using the X and Y axes on very short distances and increases cutting accuracy and speed.

It is worth noting that the laser cutting head may also be used to carry out marking, engraving or any other operation compatible with the machine's overall kinematic configuration.

These machines are not only used on metal materials but also on other materials. It should be noted that this patent application is specifically intended for work on thin metal sheets (a few tenths of a centimetre thick, up to 2 to 3 mm maximum). Typically, but not exclusively, the concept described is particularly suitable for the cutting of metal sheets and the production of shaped parts used in the air treatment, ventilation, HVAC and thermal insulation sectors.

A) Cutting gantry—or commonly called an X-Y table: In such a configuration, the material to be cut (called the blank) is laid on a table either manually, or by a robot.

This table may be fixed or movable to facilitate material loading and unloading operations. The material is immobilised during the cutting operation and the laser head moves along an X and Y route and carries out the cutting in an order which allows movements to be restricted while optimising any scrap. The most common dimensions of blanks are 1500×3000 mm, and can even go up to 2000×4000 mm.

The advantages of such gantries are numerous: the material is immobilised on the table and because of the rigidity of the gantry, the laser cutting head can therefore move at very high speeds. These cutting gantries are particularly intended for the cutting of thicker materials (steel up to 20 mm, for example) and, to a lesser degree, very thin materials. The most significant advantage on the X-Y gantry is that the metal sheet can be cut and is accessible over its entire surface. On the other hand, after the cutting operation, the waste which appears in the shape of a skeleton must remain easy to extract, and therefore should give a certain rigidity, which results in a greater loss of material.

High costs, particularly with regard to the kinematics required to move the cutting head over a large surface area, can be specifically indicated as a disadvantage of cutting gantries. The surface area occupied on the ground is also significant.

In addition, as the material is purchased in the form of blanks precut to standard dimensions, cutting is restricted to the size of the metal sheet, which often results in an inefficient use of the material. In effect, material scrap is inevitable, since the size is fixed and results from blanks purchased at standard sizes available in the trade.

B) Laser Cutting Line from a Reel of Material

This technology is more recent (within approximately the last ten years) and the most common configuration is a laser cutting head which moves along a Y-axis, perpendicular to an X-axis, a direction in which the sheet metal moves, which is "clamped" between two pairs of rollers (one pair on each side of the cutting head). The rotation of these clamping rollers in a clockwise or anticlockwise direction translates into a movement of the sheet metal in X. The combined movements in X and Y, combined with the cutting head, therefore result in the cutting of shaped pieces. A Z-axis may also be combined in order to enable constant adjustment of the distance between the metal sheet to be cut and the laser cutting head. Just as for the cutting gantry, there may also be Xa and Ya axes.

One advantage of these systems is that the material on reels is more economic to purchase than material purchased in the form of blanks. Furthermore, interleaving of pieces (=listing) along the x-axis, corresponding to the length of the material, allows scrap to be substantially reduced compared to the cutting gantry configuration.

One disadvantage of these cutting lines from reels is their footprint on the ground. In effect, the configuration of such an installation is as follows: reel-loop 1-straightener-loop 2-cutting machine-static discharge table (delivery table).

The change from one reel to another is complicated and requires the part already unrolled to be completely rewound, therefore in this direction: cutting machine>loop 2>straightener>loop 1>reel.

During cutting, the sheet metal, as mentioned, is clamped between two pairs of rollers and therefore carries out backwards and forwards movements along the x-axis, which involves the movement of the partially cut sheet metal; the pieces therefore remain suspended in a "void" or on an external table. The larger the dimensions of the parts (in the X direction), the greater the risks of deviation and accidental folding of elements. With this system, the sheet metal must also remain clamped between the two pairs of rollers to enable it to be guided and driven. In other terms, material scrap (material not used) will be necessary at the start and the end to enable the driving and guiding of the sheet metal.

Pieces with small dimensions are also problematic, as they are difficult to discharge at output and are often only discharged at the end of the cutting cycle.

This type of machine clearly does not enable the material to be worked from precut blanks. This may clearly be a disadvantage because the user will be obliged to purchase the material on reels, which, even though it is less expensive than pre-cut blanks, remains a handicap if there is just a small quantity to be produced. It is also important to draw attention to scrap which must be discharged as pieces and recovered, sorted, or in the form of a skeleton which must be processed as in the case of the cutting gantry.

SUMMARY OF THE DISCLOSED EMBODIMENTS

The purpose of the disclosed embodiments is to remedy the problems above and particularly aims to offer a cutting machine which can operate in gantry mode, that is to say by using precut blanks of material and, when functioning in on-line mode, uses material in the form of reels.

With these objectives in mind, the subject of the disclosed embodiments is a laser cutting machine comprising:

A X1 axis provided with clamps which make it possible to firmly grip a material to be cut (=the blank) in sheets or on reels, enabling the material to be moved from left to right, A Y-axis: perpendicular to the X1 axis, enabling the movement of a laser cutting head.

An X2 axis with at least one pair of clamping rollers enabling the material to be moved to the left or to the right.

A straightening/de-cambering/levelling system placed beside this X2 axis comprising a number of straightening/de-cambering/levelling rollers.

A unit incorporating the X2 axis and the straightening system which can be moved upwards or downwards.

A motorised discharge table enabling the cut elements to be discharged (scrap and good pieces) at a precise point.

In one preferable embodiment, the unit incorporating X2 and the straightening/de-cambering/levelling system is provided in its upper part with a compatible material which limits friction on the material to be cut. This material which limits friction on the material to be cut shall preferably include brushes.

The unit incorporating the X2 axis and the straightening/de-cambering/levelling system may include a parking or resting position, in which an upper surface of the unit is aligned with the machine's pass line.

The unit incorporating the X2 axis and the straightening/de-cambering/levelling system may also include a working position (top position) in which the unit is positioned so that the X2 axis is at the same level as the pass line.

The sheet may be laid manually or from an automatic system, for example a robot or a loading/unloading gantry. The origin of this blank may be external to the machine, or this blank may be generated, e.g. cut to size by the machine even from a reel. Finally, the X1 axis enables the material to be moved along its axis to the left or to the right.

A Z-axis and the Xa and Ya axes may also be applicable.

X1 and X2 may move the material in the same axis to the left or to the right.

The top position may correspond to a position from the mode for unrolling the metal sheet from the reel. In this position, the X2 axis rollers are coincident but do not interfere with the X1 axis clamps. The sheet metal may be unrolled and the clamps may be positioned so that taking hold of the material is possible with the minimum of clamping.

The bottom position may correspond to a parking position for the X2 axis and to a working position for the upper surface of the unit (X2+de-cambering). This upper surface is at the level of the machine's pass line.

The exact point where the cut elements are discharged (scrap and good pieces) is called the picking zone. Discharge may be carried out by a person in manual mode or by a robot or a loading/unloading gantry.

Alternatively and/or in addition to the motorised discharge table, a collecting tray, which may be a simple tray or a motorised conveyor taking the pieces away from the machine, may be installed below the laser cutting head. The pieces or falling scrap will therefore be of the size which relates to the width of this conveyor/trade, i.e. approximately 100 to 300 mm. The primary function is to discharge scraps of material which are extracted in an internal form to the cut sheet metal and which therefore cannot be discharged by the motorised discharge table. It should be noted that this operating method may also be applied for the evacuation of small pieces, with the sorting of these pieces therefore being done outside the machine.

BRIEF DESCRIPTION OF THE DRAWINGS

Other special features and characteristics of the disclosed embodiments will emerge from the appended drawings in which.

DETAILED DESCRIPTION

With continued reference to the various figures, special features and characteristics of the disclosed embodiments will emerge from the detailed description of an advantageous production mode of the machine 100.

In effect, this machine 100 configuration combines the separate operating modes of the cutting gantry (A) and the cutting line from reels (B), that is to say that the machine 100 enables the material to be worked on from flat blanks but also from reels.

The proposed machine 100 configuration makes it possible to discharge cut pieces and waste in a continuous flow, as the discharge of pieces is localised at a specific point using a motorised discharge table and/or a collecting tray and motorised conveyor.

The discharge of pieces 110 (parts and scrap, FIGS. 7-11) may be easily automated using a handling robot 120. Alternatively, an operator 130 may recover the pieces 110 manually and carry out a shaping operation such as rolling for producing a ferrule, or moulding, etc. The flow of cut material is continuous, so it is not necessary to wait for the entire metal sheet to be cut (as it is for the cutting gantry).

The machine 100 therefore operates in a continuous flow but it also takes up less space than configuration B and the reel-straightener distance is shortened; therefore only one control loop is necessary.

Figure 1:
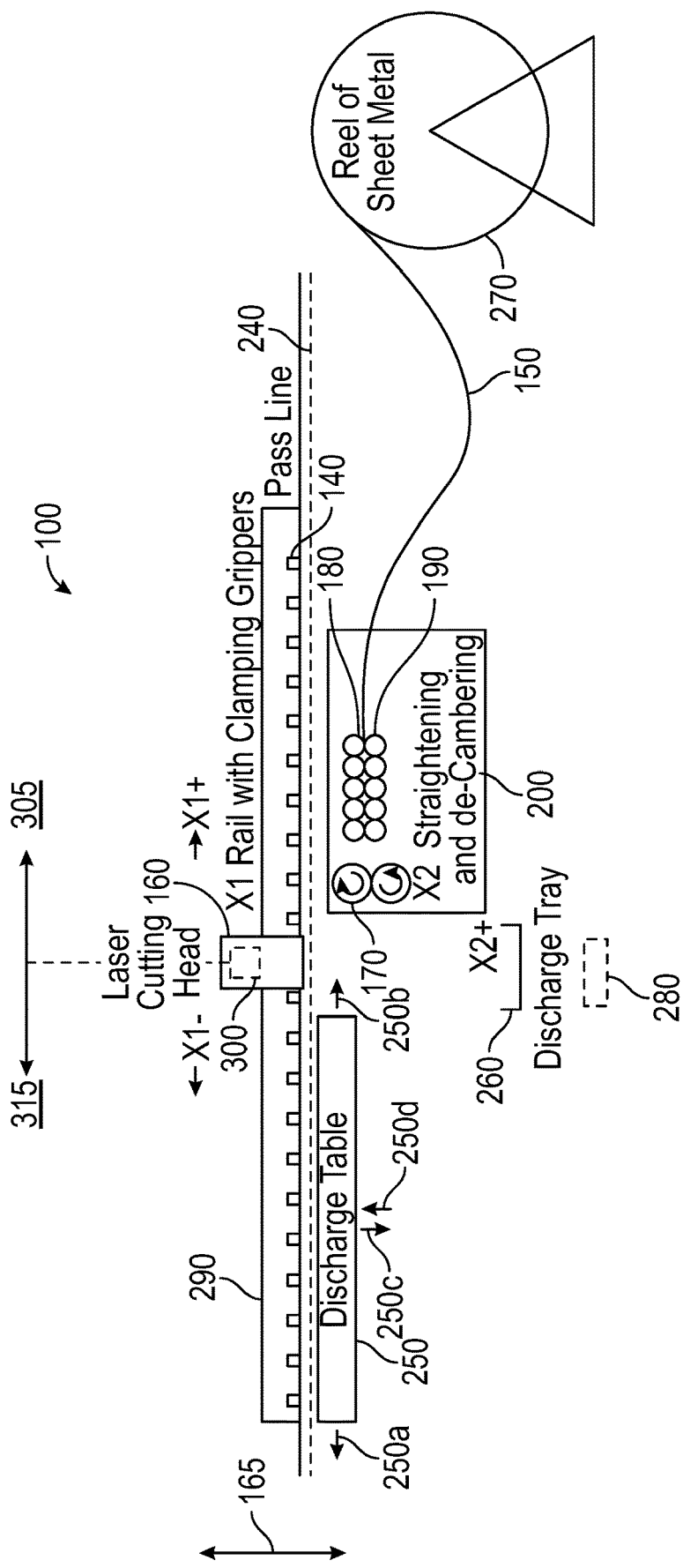
FIG. 1 shows a layout for a preferred embodiment in blank cutting mode (the X2/straightening/de-cambering/levelling unit) being in the bottom position (=at rest=parking)

In a preferred configuration, the machine 100 comprises:

An X1 axis provided with clamps 140 (FIG. 1, shown schematically) which make it possible to hold the blank 150 (uncut material) firmly. The movement of the X1 axis to the left or to the right therefore causes a similar movement of the material 150 to be cut.

A Y-axis: perpendicular to the X1 axis. The Y-axis takes up the movement of the laser cutting head 160 (Z-axis or up-down axis 165 (FIG. 1) and optional Xa along the X1 axis and Ya axis along the Y axis).

An X2 axis provided with a pair of clamping rollers 170. The rotational direction (clockwise or anticlockwise) causes the sheet metal 150 to move to the left or to the right. A straightening/de-cambering/levelling system 180 is placed next to this X2 axis which includes a number (plurality) of rollers 190 proportional to the type and thickness of the material 150 to be straightened. Generally speaking, the thicker the material or more non-plastic the material, the greater the number of straightening rollers 190. The positioning of these rollers 190 can be done manually or in a motorised fashion.

A unit 200 including X2 and the straightening system 180. This unit 200 moves upwards or downwards and in its upper part 210 (FIG. 3) is provided with a compatible material limiting friction on the material 150 to be cut (this may typically be brushes 230, shown schematically, but not exclusively). In the bottom position (=parking position or rest position), the upper surface 220 is aligned with the machine's pass line 240. In the top position, the unit 200 is positioned so that the X2 axis is at the same level as the pass line. It is in this top position that the unrolling of the sheet metal 150 via X2 may take place.

A motorised discharge table 250. The travel direction is perpendicular to the X1 axis, but not necessarily. In effect, the travel direction may be parallel to the X1 axis. The objective of this motorised table 250, in combination with specific operating cycles, is to discharge cut elements 110 (scrap and good uses, including parts) at a precise point.

The machine 100 can operate in two separate operating cycles.

Sheet by sheet: the operator 130 lays down the blank 150 and positions it in the clamps 140. The combination of the movements of the X1 and Y axes combined with the cutting head 160 enables cutting to take place. Operation in conjunction with the motorised table 250/discharge conveyor tray 260 enables the discharge of cut pieces and scrap.

To this end, cuts always take place with the movement of X1 from the right to the left, with each cut element falling naturally onto the table 250. Once the complete length of the sheet metal is cut, the latter makes an unladen movement from the left to the right. Once this movement has been carried out, the laser cutting head 160 positions itself and the cutting operation takes place by moving the X1 axis from the right to the left, etc. it is clear that the machine 100 may also be configured with a passing direction of the material from the left to the right, From reels: the unit 200 including X2 and the straightener (straightening system 180) is positioned in height so that the X2 axis is at the same height that the machine 100 passes X2 and then unroll the reel 270 over a length optimised according to the pieces to be produced.

Once the desired length is reached, the clamps 140 are activated to hold the sheet metal 150, and the laser head 160 cuts the sheet metal 150. As soon this happens, the unused piece reverses via X2 to a position which allows the X2 and straightening/de-camping/levelling unit 200 to be lowered to the bottom position.

In fact, the sheet metal 150 which is held in the clamps 140 on the X2 axis may undergo a cutting cycle according to the sheet-by-sheet mode described above, with the latter being on the pass line.

The machine 100 makes it possible to have a true operating mode sheet-by-sheet and from reels, which is unique.

The combination of the discharge table 250/tray and discharge conveyor 280 (shown schematically in FIG. 1) and cutting cycles makes it possible to have efficient discharge of cut pieces in a continuous flow, which is not the case with configurations A and B.

Other special features and characteristics of the disclosed embodiments will emerge from the appended drawings in which:

FIG. 1 shows a layout for a preferred embodiment in blank cutting mode (the X2/straightening/de-cambering/levelling unit) being in the bottom position (=at rest=parking). FIG. 1 shows a reel 270 of sheet material 150, a unit 200 with clamping rollers 170 and a straightening system 180, a clamp rail 290 with clamps 140 (or clamping grippers, shown schematically), a laser cutting head 160 on a head rail 300 (shown schematically), a discharge table 250, a discharge tray 260 and a pass line 240. The head rail 300 extends in a Y direction (FIG. 2) that is perpendicular to the X1 axis.

The unit 200 is on one side 305 (the feed side) relative to the X1 direction of the head rail 300 and the discharge table 250 is on another side (the discharge side) 315 relative to the X1 direction of the head rail 300. Motion of the discharge table 250 is shown with arrows 250a along discharge direction +X1, 250b in a reverse-feed direction −X1, 250c upwardly along an up-down axis 165, 250d downwardly along the up-down axis. Rotational motion of the clamping rollers 170 is shown with axis X2, in clockwise +X2 and counterclockwise −X2 directions. Motion of the head rail 300 is shown along the X1 axis in a discharge direction +X1 and a reverse-feed direction −X1, e.g., toward the reel 270. As explained below, in operation, the discharge table 250, discharge tray 260, the head rail 300 and the unit 200 move in the discharge direction while the unit 200 receives uncut stock (material blank) from the reel 270.

Figure 2:
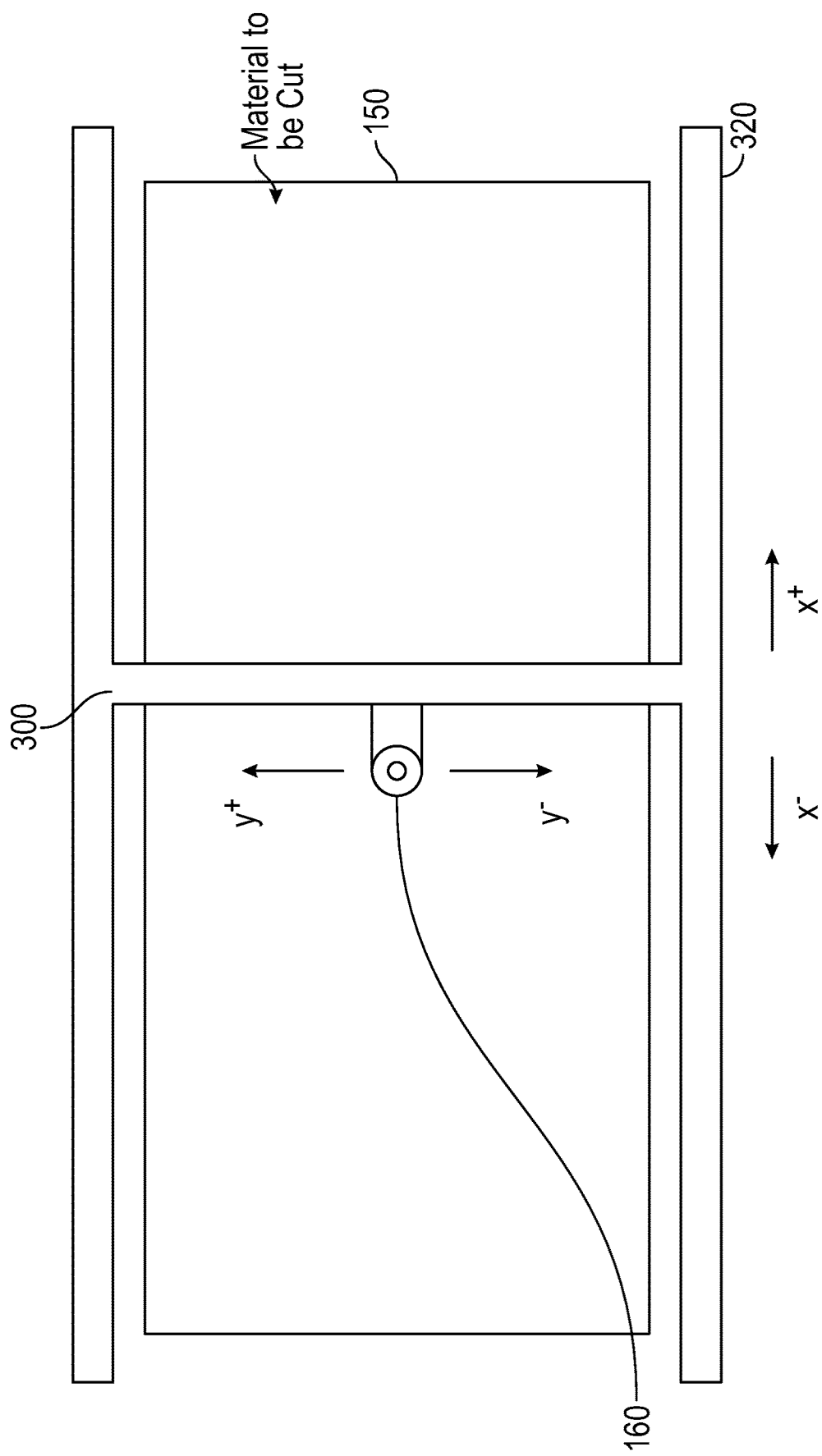
FIG. 2 shows a diagrammatic view of a X, Y cutting gantry.

FIG. 2 shows a diagrammatic view of a X, Y cutting gantry 320. The cutting head 160 moves along +Y and −Y directions. The configuration enables complete scanning of the table 250 which the uncut material 150 is found.

Figure 3:
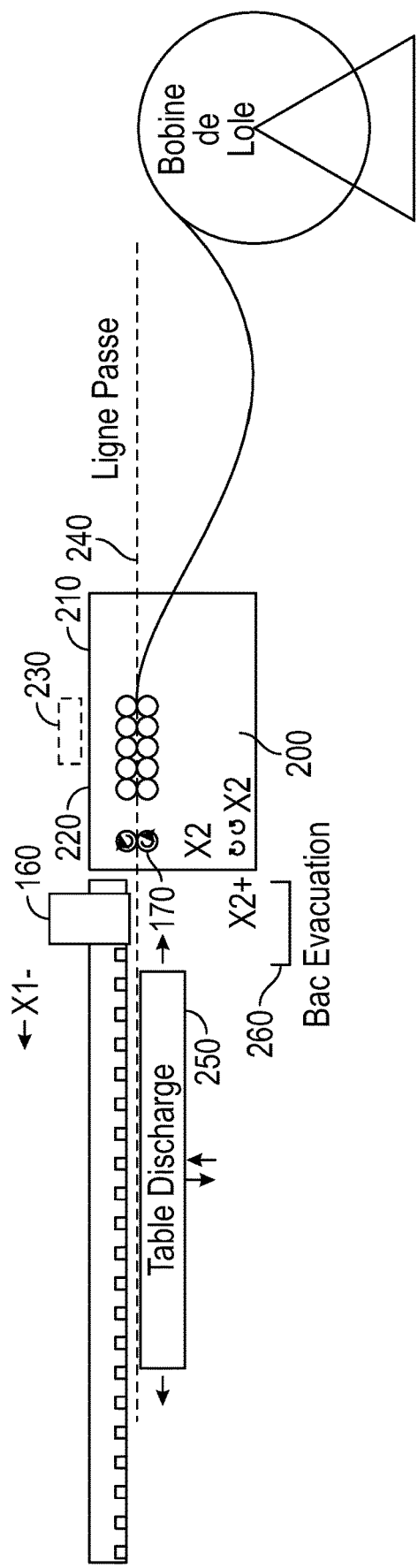
FIG. 3 shows a layout for a preferred embodiment in cutting from a reel mode (the X2/straightening/de-cambering/levelling unit) being in the top position.

FIG. 3 shows a layout for a preferred embodiment in cutting from a reel mode the X2/straightening/de-cambering/levelling unit 200 being in the top position such that the X2 axis is level with the pass line 240. The unit 200, head rail 300 discharge table 250 and discharge tray 260 are at a right-most position, e.g., along the material reverse-feed direction −X1.

Figure 4:
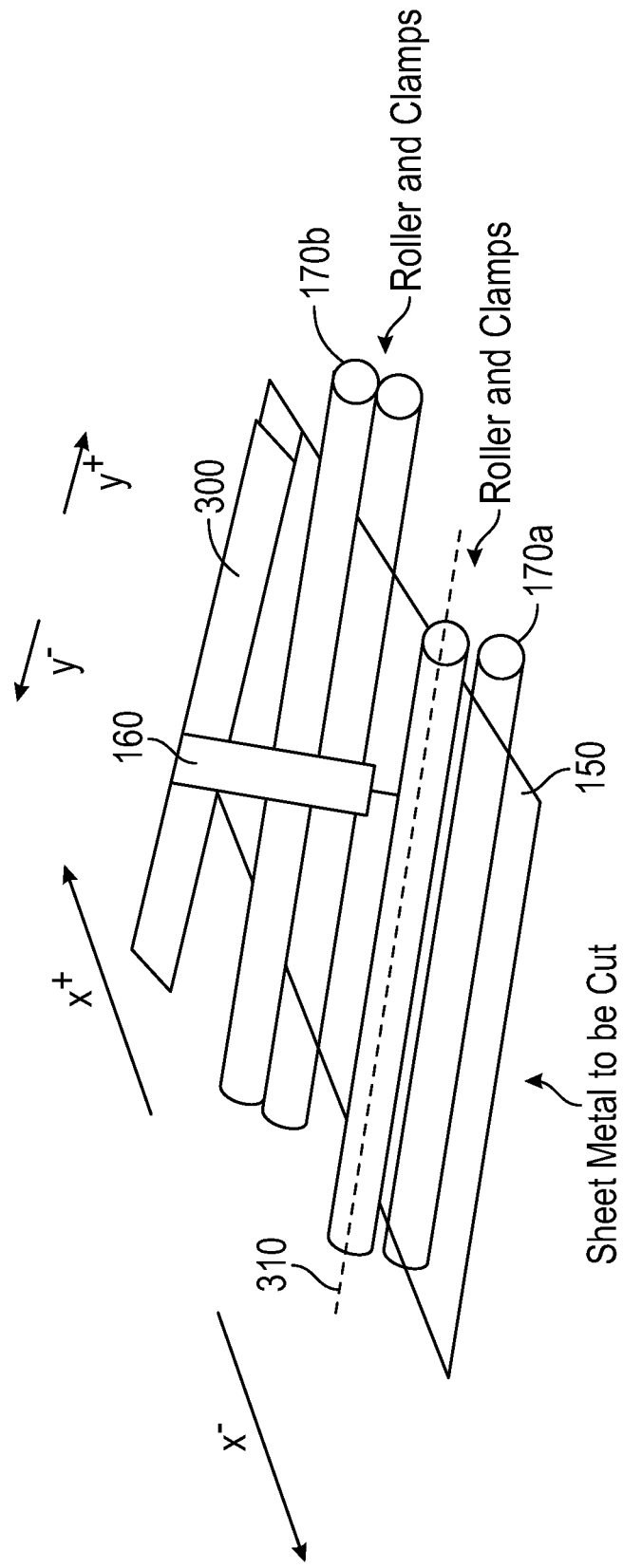
FIG. 4 is a schematic overview of a machine which cuts only from reels.

FIG. 4 is a schematic overview of a machine 100 which cuts only from reels 270. The figure shows uncut material 150, two pair of clamping rollers 170a, 170b the cutting head 160 on the head rail.

Figure 5:
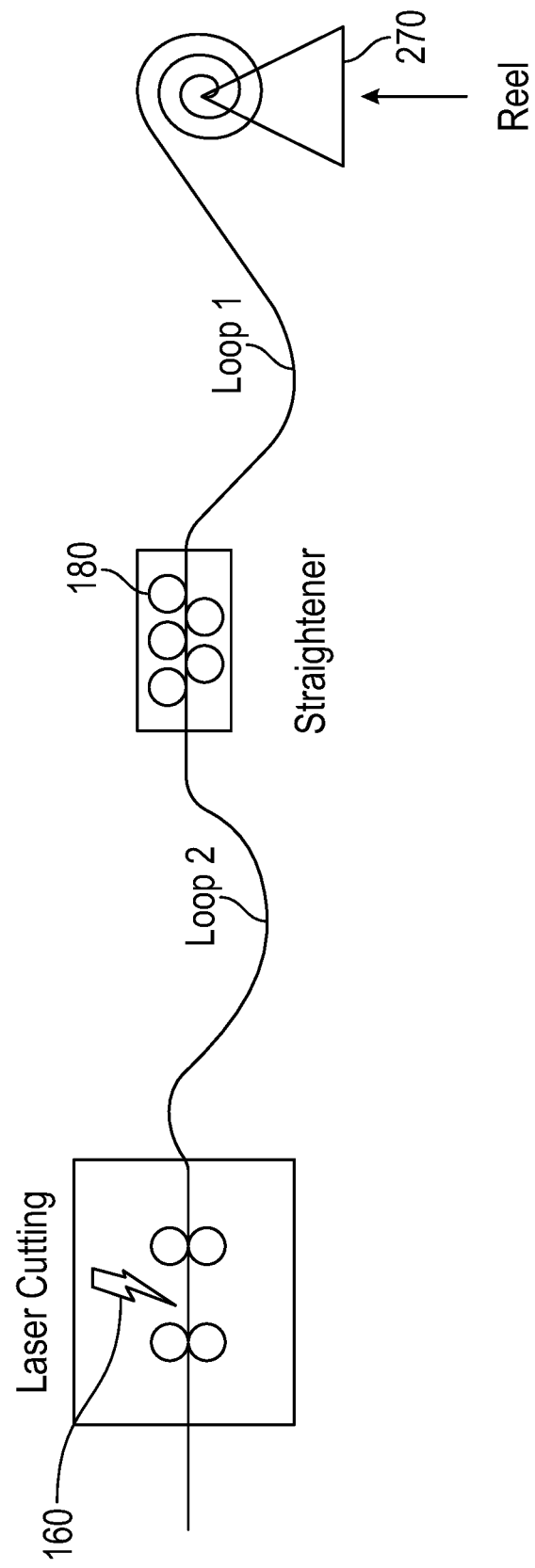
FIG. 5 shows a layout for a preferred embodiment in cutting from a reel mode as carried out on a line (FIG. 4)

FIG. 5 shows a layout for a preferred embodiment in cutting from a reel mode as carried out on a line (FIG. 4). The two loops (1 and 2) are represented. This figure shows a reel 270, the straightening system 180, and a laser cutting head 160.

Figure 6:
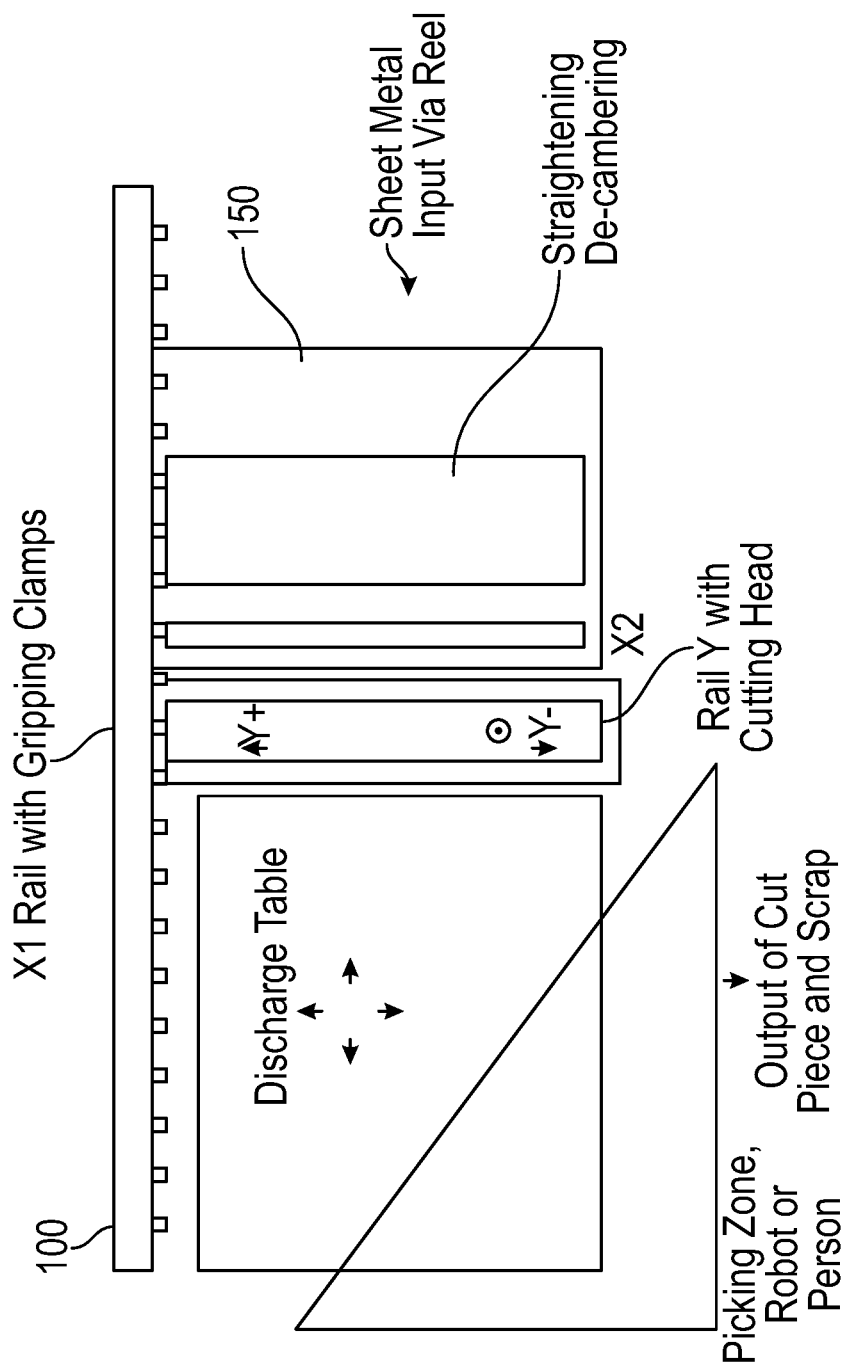
FIG. 6 is a diagrammatic view of the top showing the layout of the various elements of a machine for cutting from reels and from flat blanks.
Figure 7:
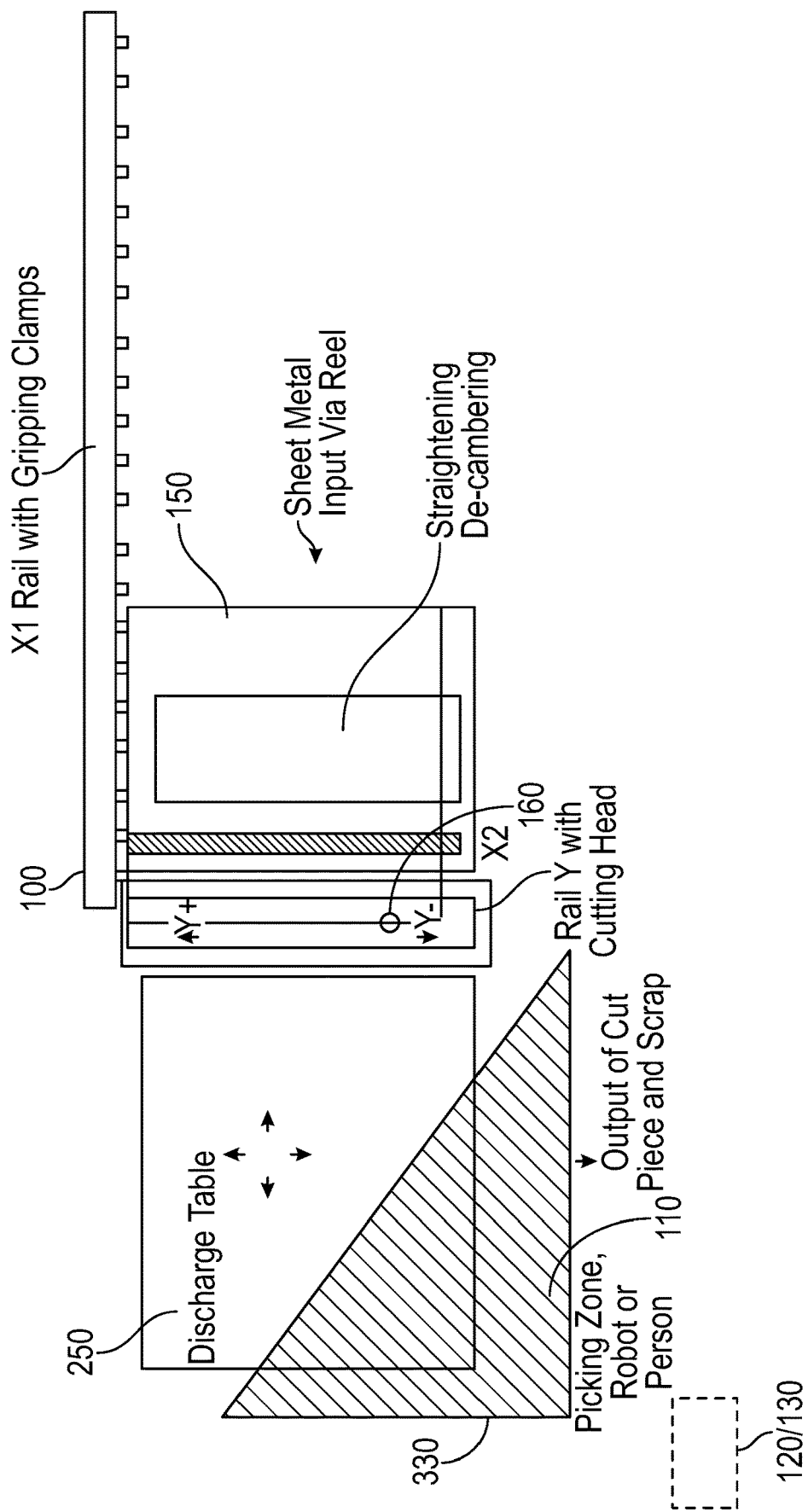
FIGS. 7 to 11 illustrate the cutting of a shaped piece from a blank.
Figure 8:
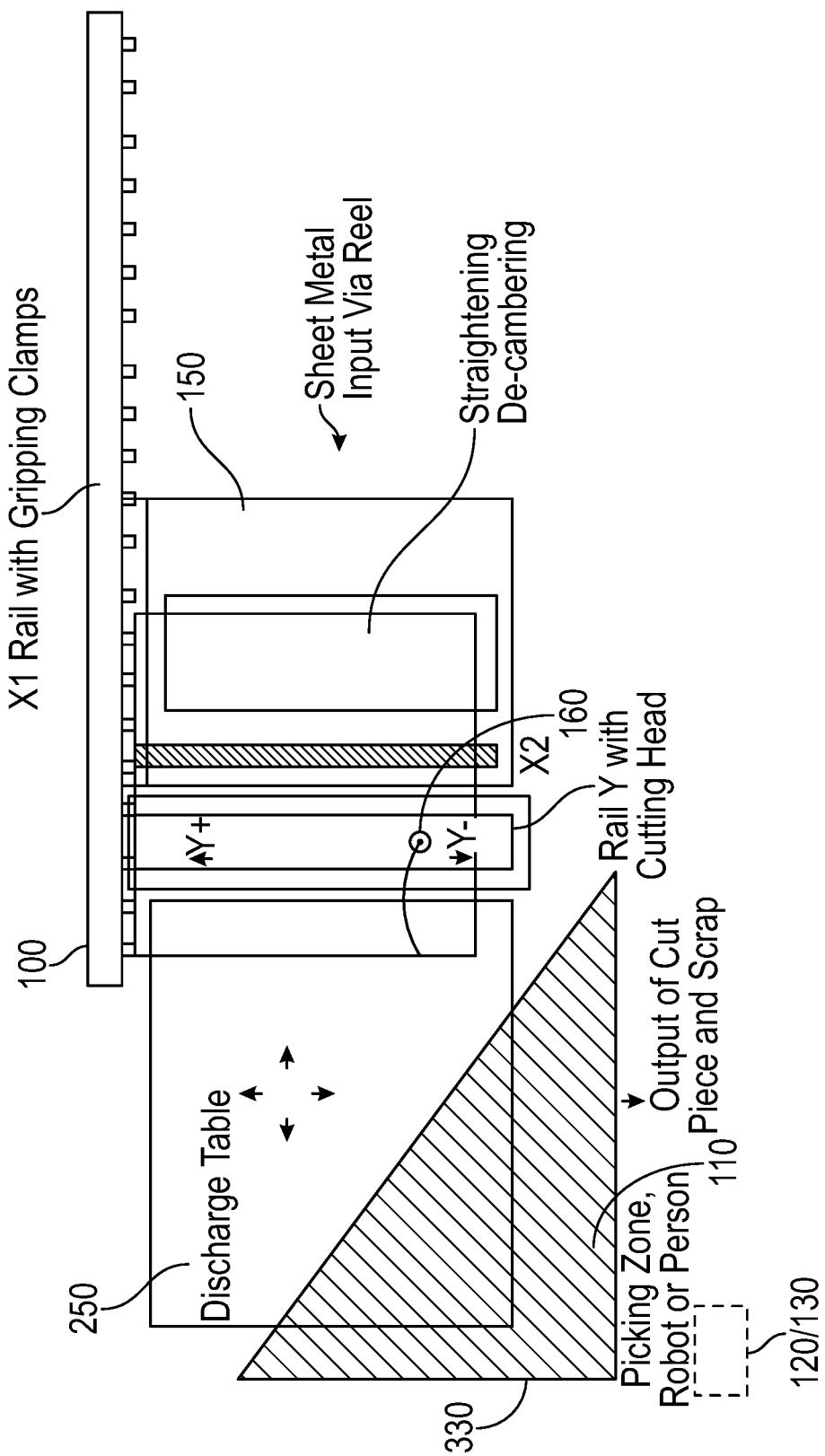
Figure 9:
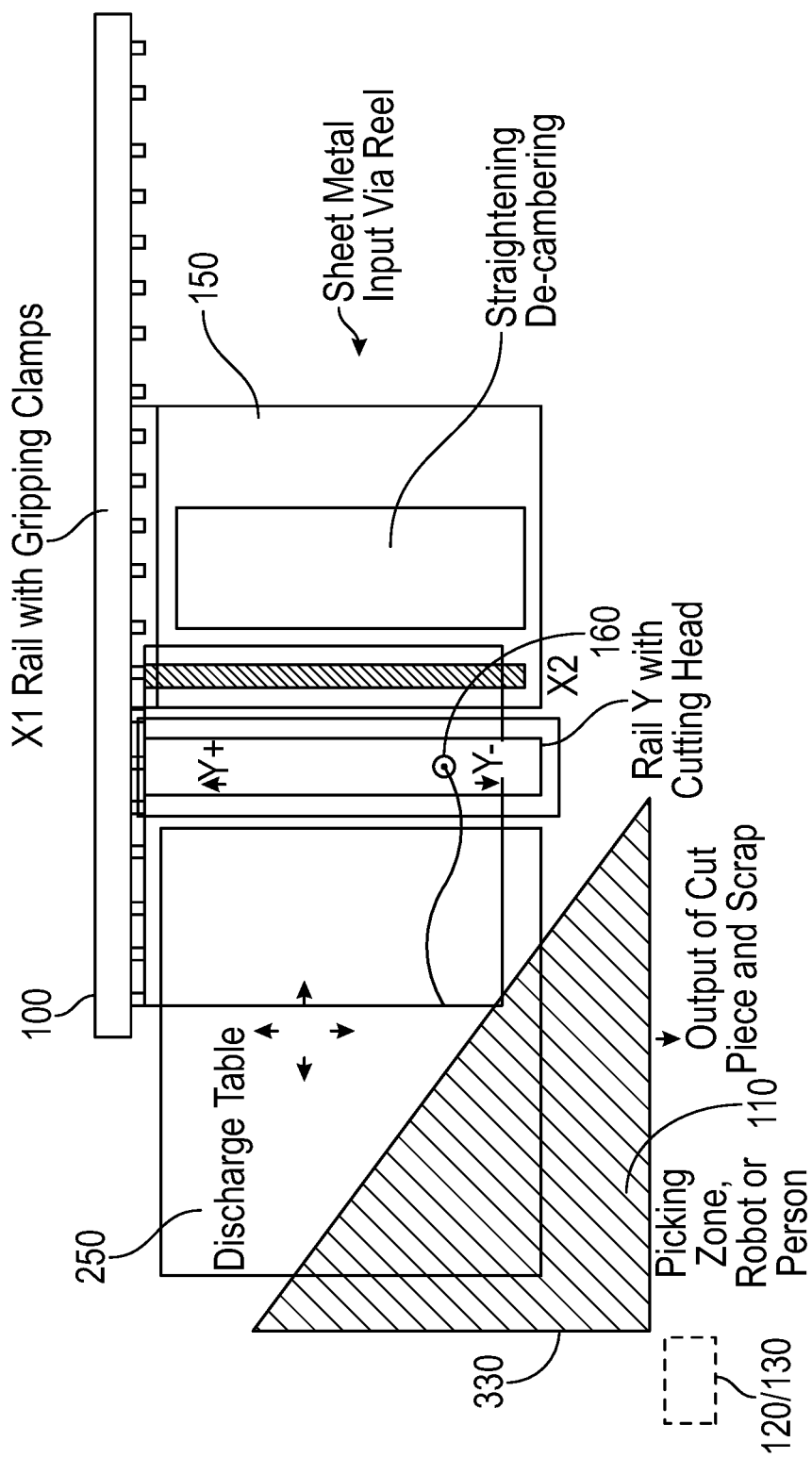
Figure 10:
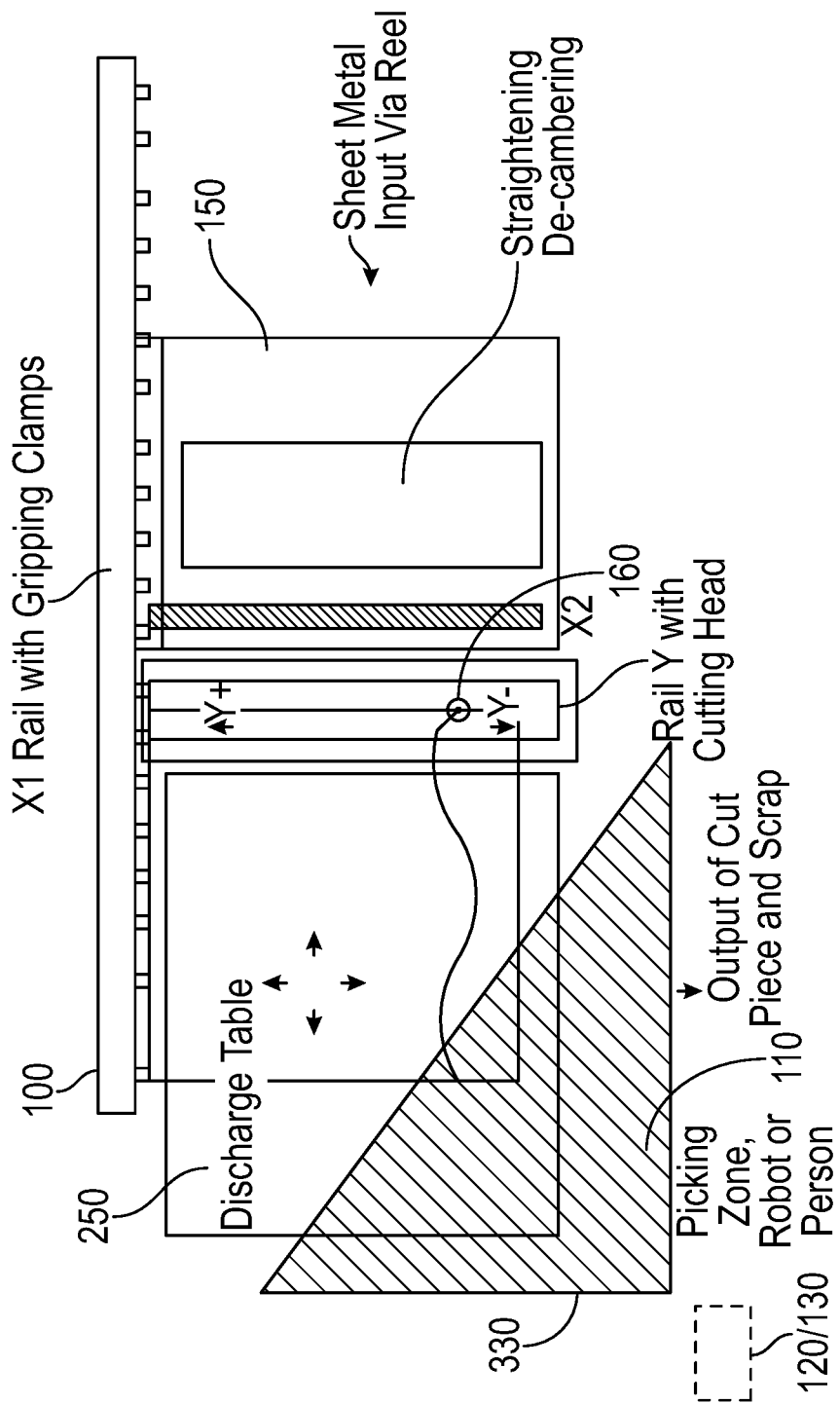
Figure 11:
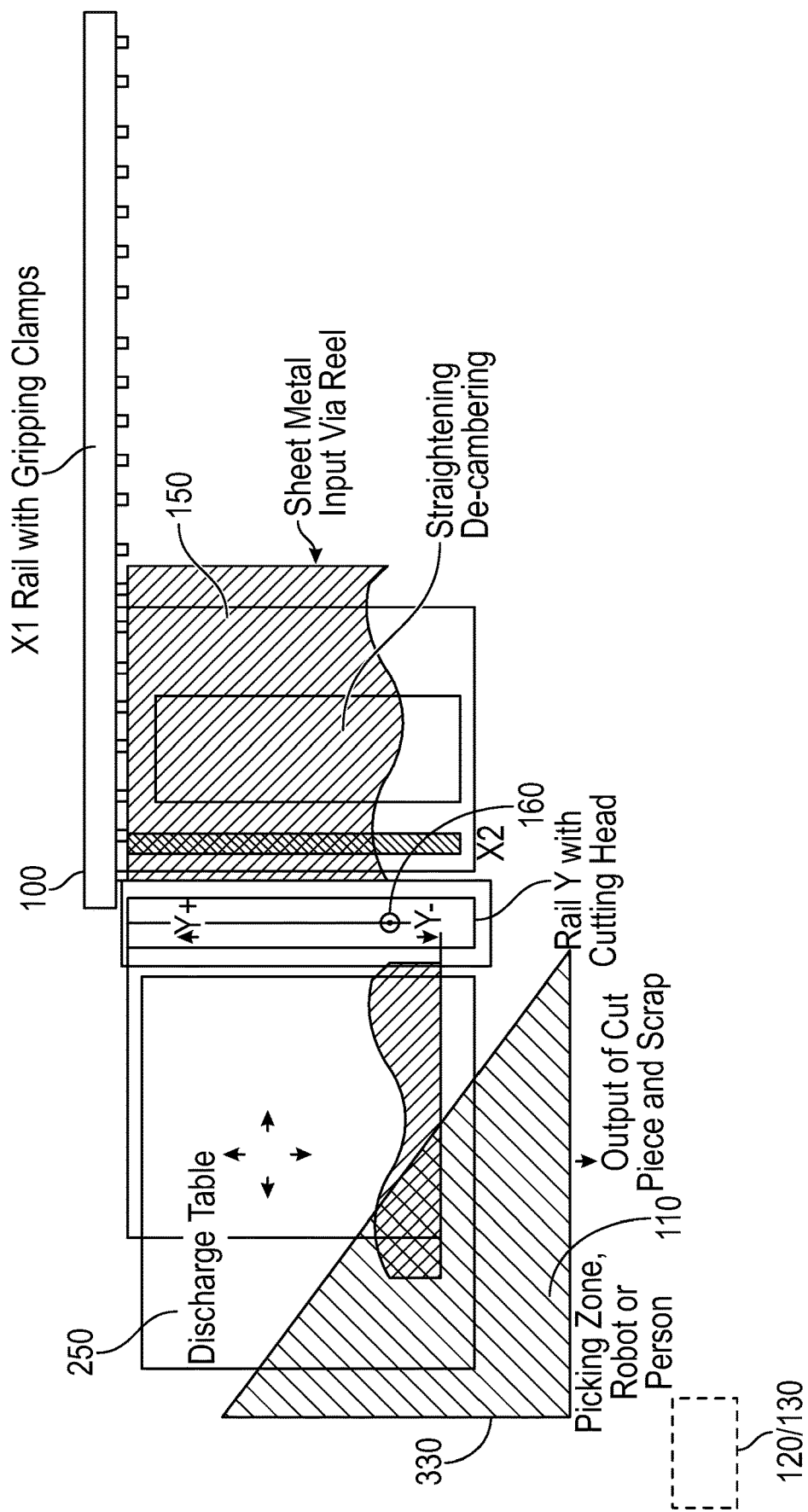
Figure 12:
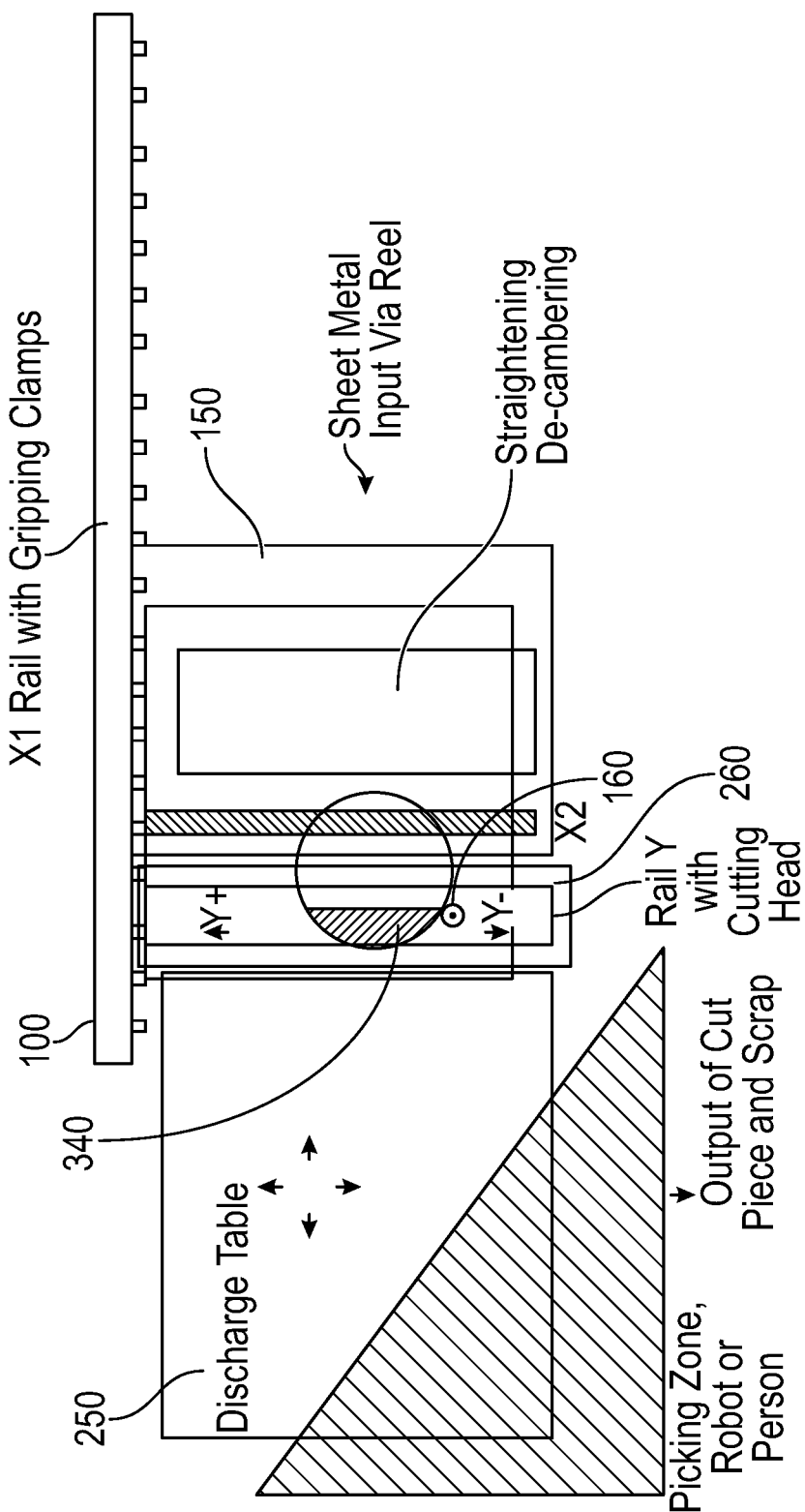
FIGS. 12 to 15 illustrate the cutting of material scrap to be extracted from the middle of the blank.
Figure 13:
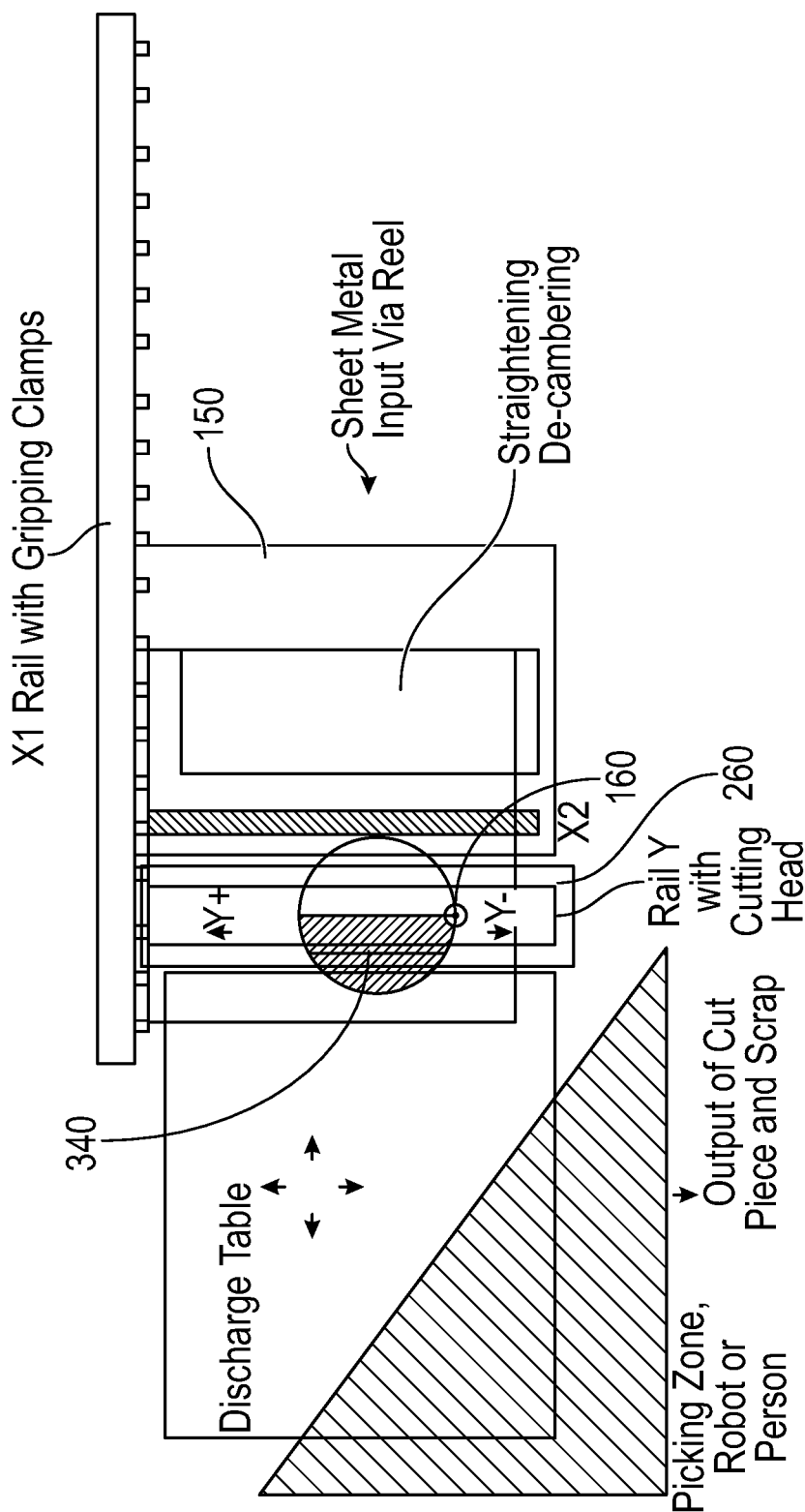
Figure 14:
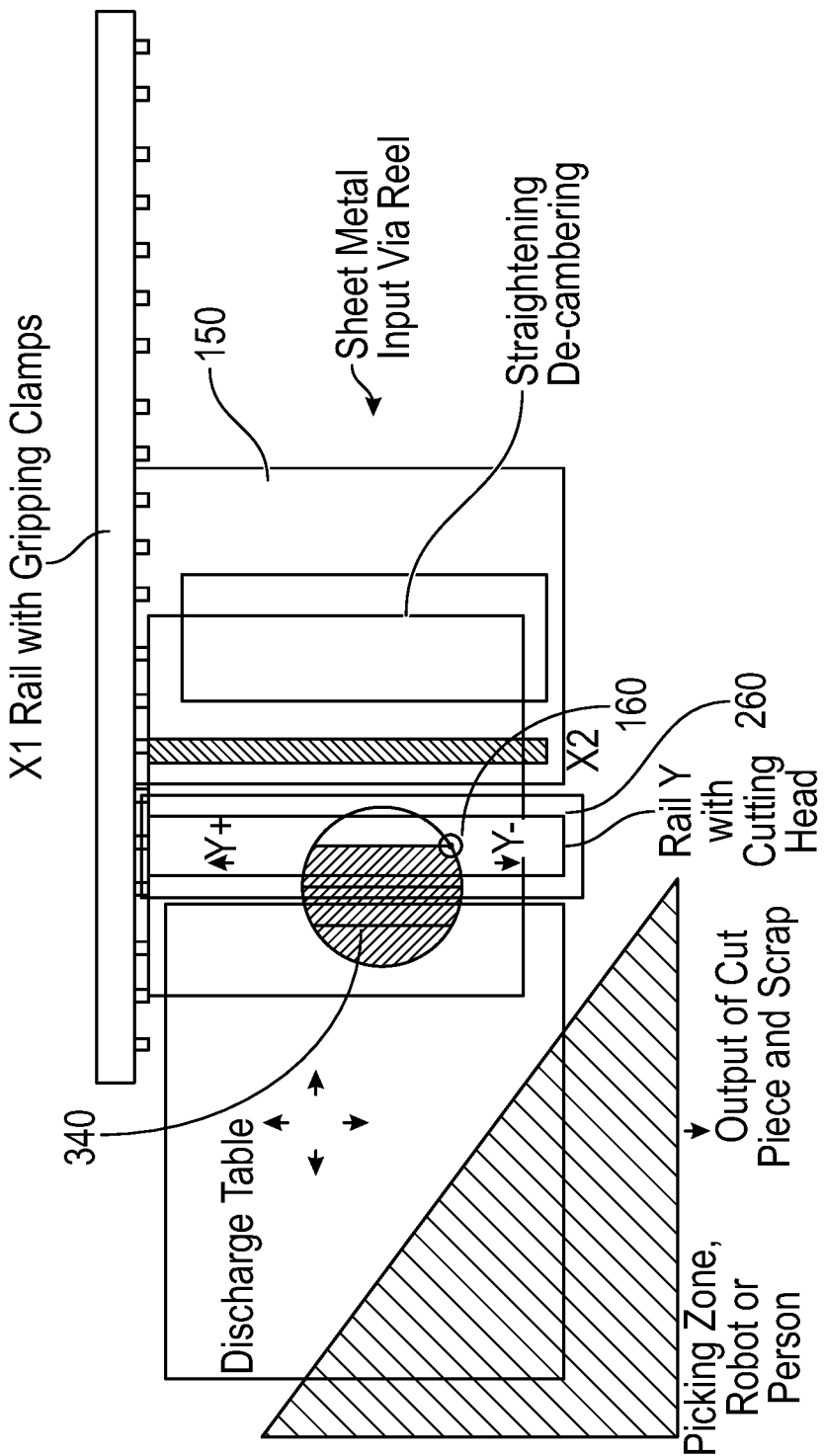
Figure 15:
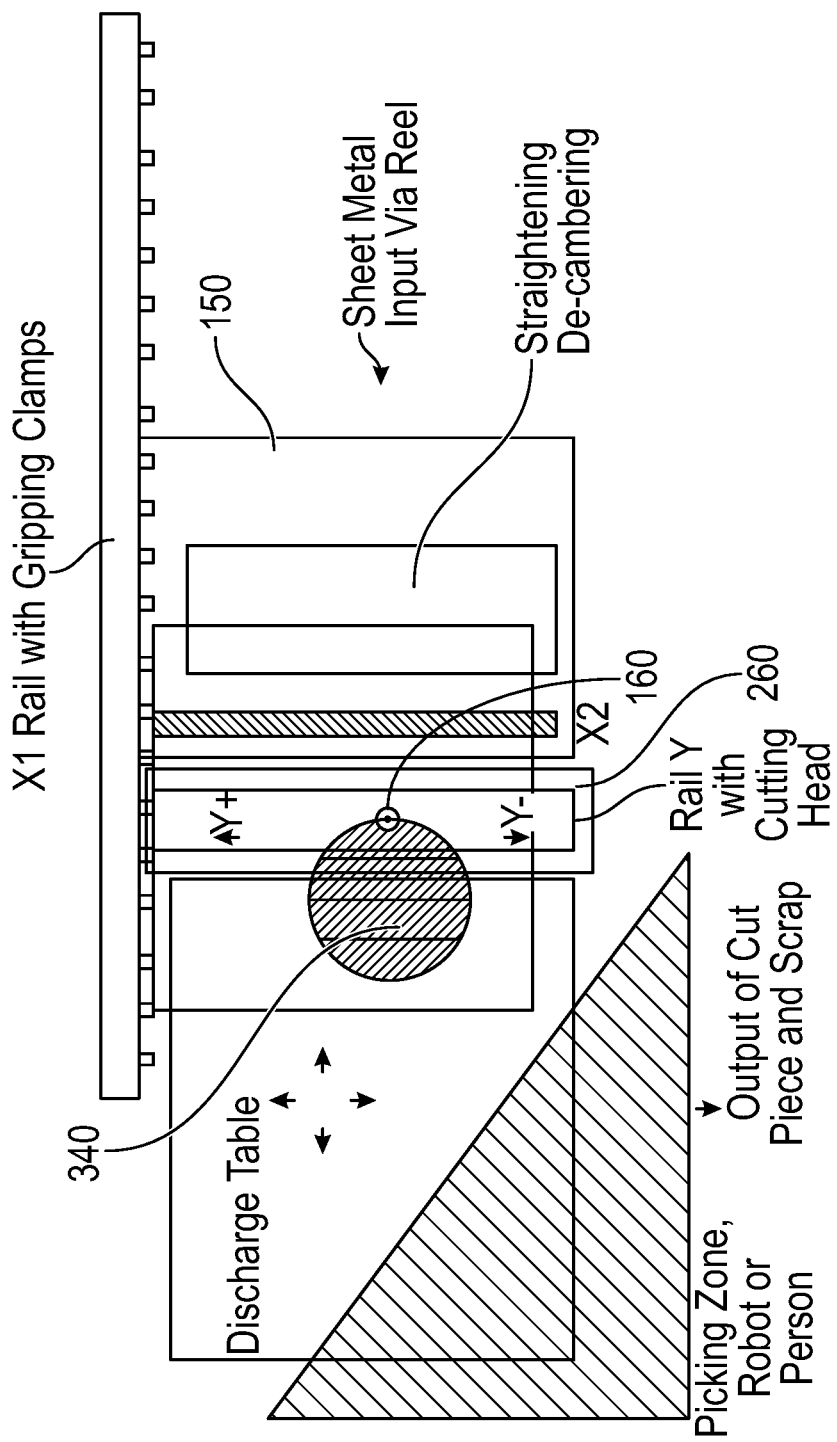

FIG. 6 is a diagrammatic view of the top showing the layout of the various elements of a machine 100 for cutting from reels 270 and from flat blanks 150. It is important to stress that the two separate operating modes cohabit (from flat blanks) and from reels, the clamps 140 as indicated are coincident in both cases but do not interfere, in summary their mechanical constitution and position makes both operating modes possible.

FIGS. 7 to 11 illustrate the cutting of a shaped piece from a blank, the blank is located to the right of the laser cutting head 160, the discharge of the piece can be done favourably by the motorised discharge table 250 which is to the left of the laser cutting head 160. Gradually the X1 axis will move to the left and the Y-axis will also move; the conjunction of these two axes will determine the path of the cut which will appear between FIGS. 8 to 10, and which finally in FIG. 11 will discharge the piece through the movement of the motorised discharge table 250, discharging the part and scrap 110 outside the machine 100 to the picking zone 330.

The cycle can continue, the X1 axis moves the remaining sheet metal (represented by hatching and positioned to the right), and the next cut can start etc.

FIGS. 12 to 15 illustrate the cutting of material scrap to be extracted from the middle of the blank 150. The blank 150 is located to the right of the cutting head 160, the discharge of the scrap which is cut into successive slices which will fall downwards into the recovery tray/motorised conveyor 280. Gradually the X1 axis will move to the left and the Y-axis will also move; the conjunction of these two axes will determine the path of the cut which will appear between FIGS. 12 to 15, to finally discharge a round shape 340 in this example (any geometric shape whatsoever can also be cut).

To sum up, this laser cutting machine 100 makes it possible to cut from reels 270, the suitable clamping of the flat blank and the suitable discharge of cut pieces and scrap result in the most optimised solution which can exist on the market in order to:

Save material,

Produce an extremely flush "nesting" between parts because a rigid skeleton is no longer necessary, Remove the need to keep a skeleton once the pieces are cut, And therefore suitable elimination of scrap in small elements, Intelligent recovery in a continuous flow of cut elements=no dead time, Possible integration of an automatic system for the loading and unloading of material/the machine can therefore work autonomously over long periods/or a manual solution for loading/unloading operations.

Control System and Software

This patent application does not describe the automation and the system which allows the shape and dimensions of the pieces to be cut to be determined. The most generally used software system described as a dedicated CAD/CAM within the applicable sector (HVAC, thermal insulation, etc.) combined with a "nesting" type application to limit material scrap. These CAD/CAM and nesting systems are used in all modern cutting systems, whether these are cutting gantries, or systems that cut from a reel. These CAD/CAM and nesting systems can be easily adapted by a skilled person to correspond to the machine's functionality and geometry.

Cutting Strategy

A technique used for the cutting of thin sheet metal and low-resistance material (e.g. thin aluminum from 0.4 to 0.7 mm used in thermal insulation) consist of leaving micro-fasteners between the various pieces. When the cutting process on a metal sheet of determined dimensions is finished, the blank is extracted from the machine and the pieces are detached manually, the micro-fastener then being broken by a repetitive cracking movement or by a pair of scissors. The shaped pieces to be recovered and the scraps are then sorted manually. This working method may sometimes be preferred depending on the type of user. For example, blanks may be precut with micro-fasteners in a centralised workshop and then be sent flat to a decentralised site to be processed there.

This laser cutting machine can clearly accept this working method which is fundamentally connected to the cutting pass which will be generated by the CAD/CAM system.

As indicated above, a laser cutting machine 100 is provided. The machine 100 includes clamps 140, arranged on a clamp rail 290 disposed along an X1 axis. The clamps 140 are configured to grip uncut material 150. The uncut material 150 is configured in sheets or on reels 270. The laser cutting machine 100 is configured to move the uncut material 150 from left to right, i.e., along the X1 axis.

A laser cutting head 160 is arranged on a head rail 300 disposed along a Y axis, which is perpendicular to the X1 axis. The laser cutting head 160 is configured to move along a Y axis.

Clamping rollers 170 are configured to rotate about an X2 axis, a rotational centre 310 (FIG. 4) of which extends along the Y axis. The clamping rollers 170 are configured to move the uncut material 150 to the left or to the right, i.e., along the X1 axis.

A straightening system 180 (otherwise referred to as the straightening/de-cambering/levelling system) is configured for straightening/de-cambering/levelling the uncut material 150. the straightening system 180 is disposed adjacent the X2 axis relative to the X1 axis. The straightening system 180 includes a plurality of rollers 190 defining a roller rotational axis 310 that is along the Y axis.

A unit 200 disposed on one side 305 of the head rail 300 along the X1 axis. The one side 305 defining a material feed side of the laser cutting machine 100. The unit 200 includes the clamping rollers 170 and the straightening system 180. The unit 200 is configured to move along an up-down axis 165, i.e., in a direction perpendicular to the X1 axis and Y axis. This moves the clamping rollers 170 and straightening system 180 in the up-down axis 165.

A motorised discharge table 250 is disposed on another side 315 of the head rail 300 along the X1 axis, defining a material discharge side of the laser cutting machine 100. The motorised discharge table 250 is configured to discharge cut elements 110, including scrap and non-scrap, at a location along the X1 axis on the other side 315 of the head rail 300.

In operation, the unit 200, the head rail 300, and the motorised discharge table 250 are configured to move along the X1 axis, toward the material discharge side X, while the laser cutting head 160 is cutting the uncut material 150, e.g. feed from the reel.

In one embodiment, the unit 200 defines an upper part 210. The upper part defines an upper surface 220. The upper part 210 includes brushes 230 configured to limit friction between the upper surface 220 and the uncut material 150.

In one embodiment, the unit 200 is configured to be disposed in a parking position, defining a bottom position. In the bottom position, the upper surface 220 of the unit 200 is level with, in the up-down axis 165, a pass line 240 of the laser cutting machine 100.

In one embodiment, the unit 200 is configured to be disposed in a working position, defining a top position. In the top position, the unit 200 is positioned so that the X2 axis level with, in the up-down axis 165, the pass line 240.

In one embodiment, a recovery tray or a motorised conveyor 280, located below, along the up-down axis 165, the laser cutting head 160. The recovery tray 260 or a motorised conveyor 280 is configured to receive discharged materials from the laser cutting machine 100.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A laser cutting machine comprising:
    clamps, arranged on a clamp rail disposed along an X1 axis, wherein the clamps are configured to grip uncut material, wherein the uncut material is configured in sheets or on reels, so that the laser cutting machine is configured to move the uncut material from left to right along the X1 axis,
    a laser cutting head arranged on a head rail disposed along a Y axis, perpendicular to the X1 axis, so that the laser cutting head is configured to move along a Y axis,
    clamping rollers configured to rotate about an X2 axis, a rotational centre of which extends along the Y axis, and the clamping rollers being configured to move the uncut material to the left or to the right along the X1 axis,
    a straightening system configured for straightening, de-cambering and levelling the uncut material, disposed adjacent the X2 axis relative to the X1 axis, and comprising a plurality of rollers defining a roller rotational axis that is along the Y axis,
    a unit disposed on a first side of the head rail along the X1 axis, the first side defining a material feed side of the laser cutting machine, the unit including the clamping rollers and the straightening system, wherein the unit is configured to move along an up-down axis, in a direction perpendicular to the X1 axis and Y axis, thereby moving the clamping rollers and straightening system along an up-down axis, and
    a motorised discharge table disposed on a second side of the head rail along the X1 axis, defining a material discharge side of the laser cutting machine, configured to discharge cut elements, including scrap and non-scrap, at a location along the X1 axis on the second side of the head rail,
    wherein in operation, the straightening system, the unit, the head rail, and the motorised discharge table are configured to move along the X1 axis, toward the material discharge side, while the laser cutting head is cutting the uncut material.

2. The laser cutting machine according to claim 1, wherein the unit defines an upper part, wherein the upper part defines an upper surface, wherein the upper part includes brushes configured to limit friction between the upper surface and the uncut material.

3. The laser cutting machine according to claim 2, wherein the unit is configured to be disposed in a parking position, defining a bottom position, at which the upper surface of the unit is level with, along the up-down axis, a pass line of the laser cutting machine.

4. The laser cutting machine according to claim 3, wherein the unit is configured to be disposed in a working position, defining a top position, at which the unit is positioned so that the X2 axis is level with, along the up-down axis, the pass line.

5. The laser cutting machine according to claim 1, including a recovery tray or a motorised conveyor, located below, along the up-down axis, the laser cutting head, configured to receive discharged materials from the laser cutting machine.

* * * * *